July 18, 1950     H. A. STEVENSON     2,515,274
HYDRAULIC UNIT FOR CABLE EXPANSION AND CONTRACTION
Filed July 12, 1946     4 Sheets-Sheet 1
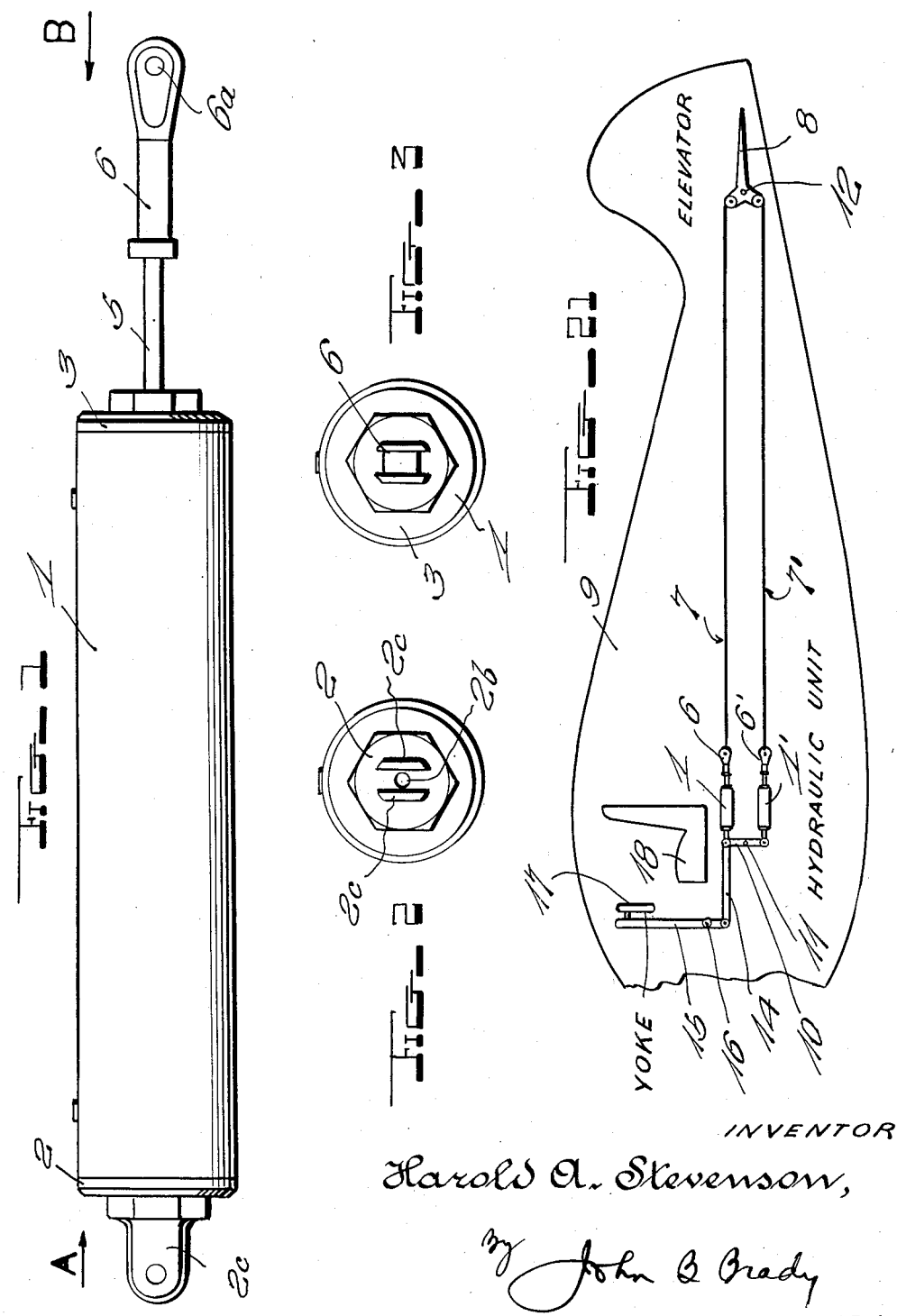
INVENTOR
Harold A. Stevenson,
By John B. Brady
ATTORNEY

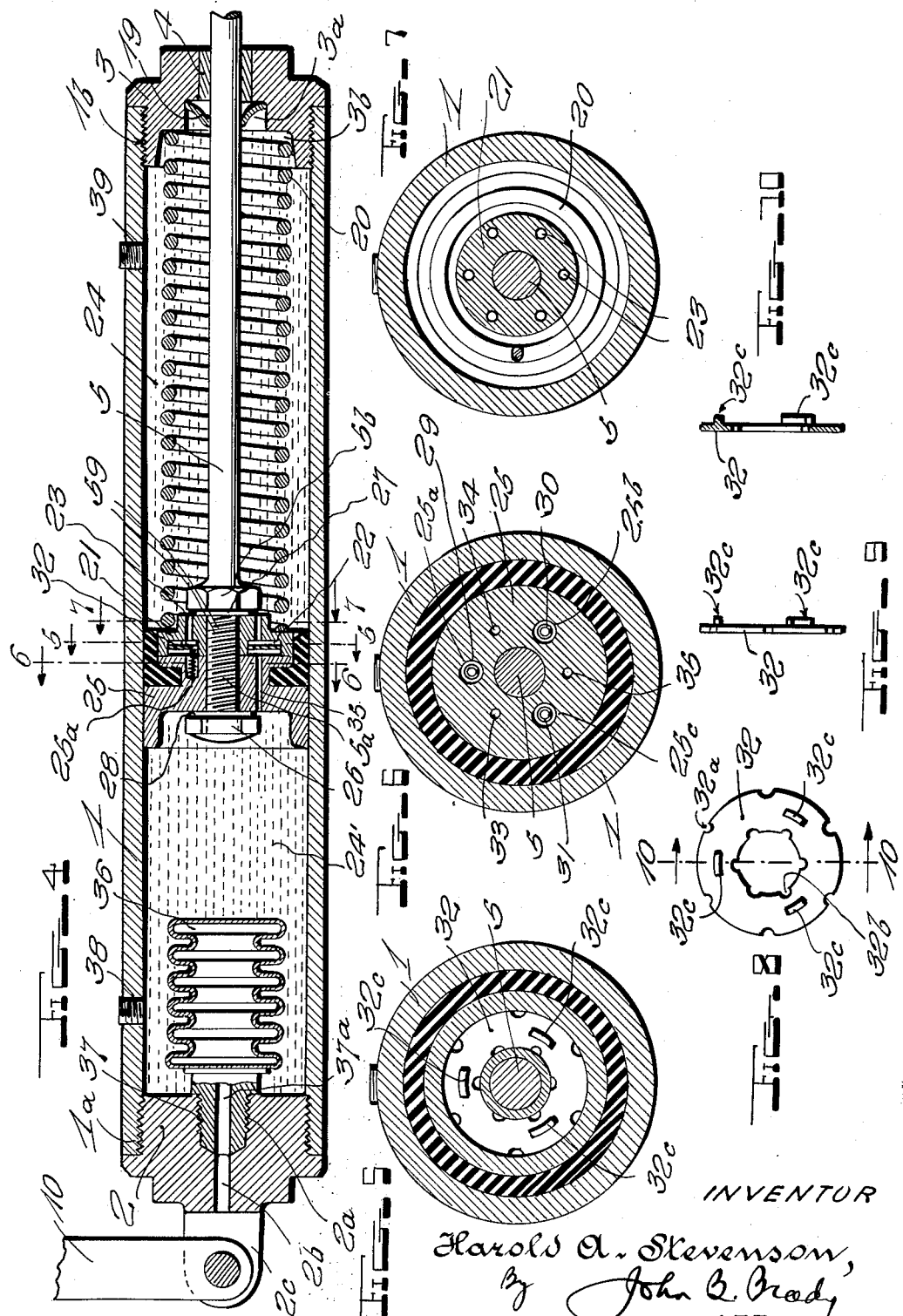

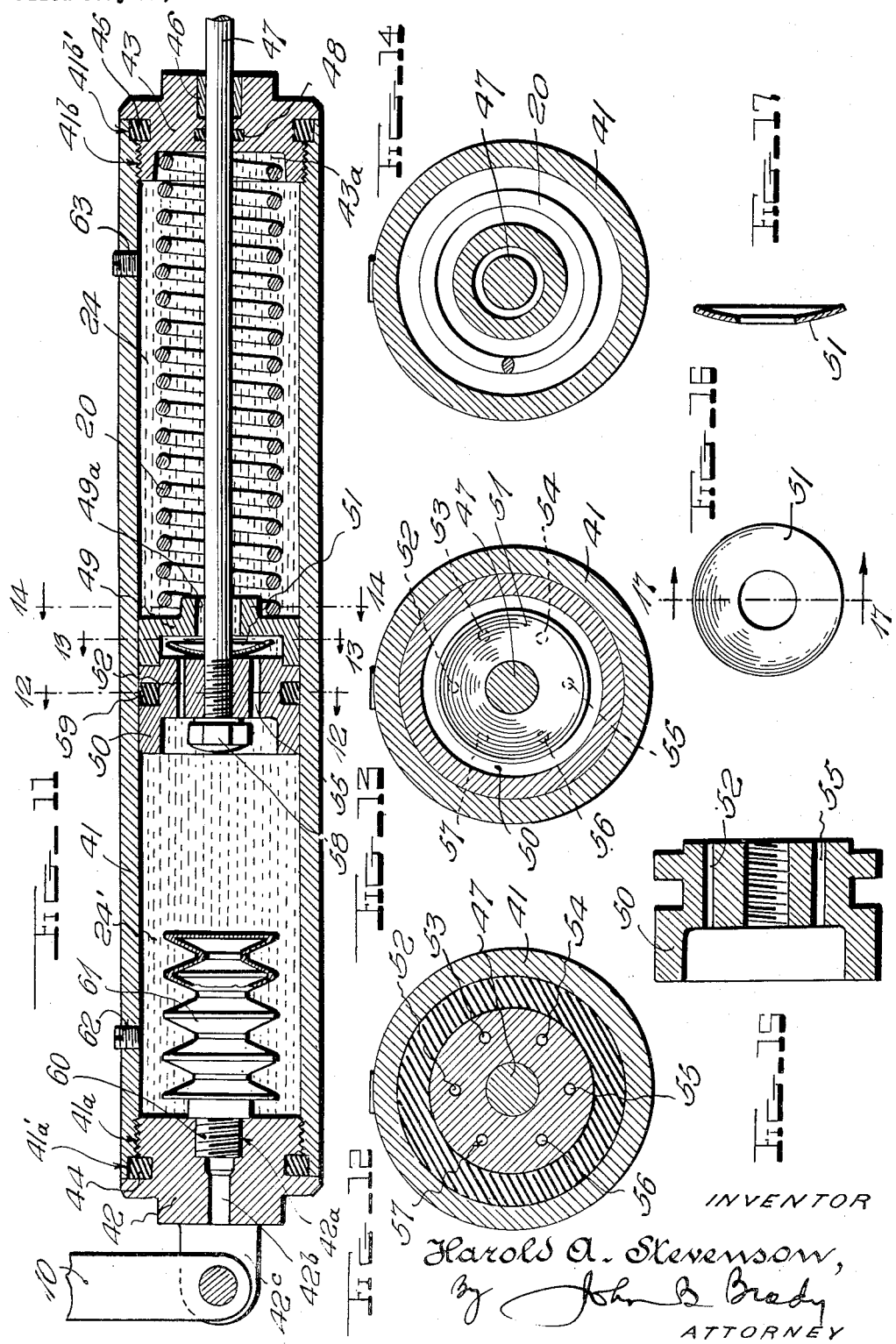

July 18, 1950  H. A. STEVENSON  2,515,274
HYDRAULIC UNIT FOR CABLE EXPANSION AND CONTRACTION
Filed July 12, 1946  4 Sheets-Sheet 4

Inventor
Harold A. Stevenson,
By John Q. Brady
Attorney

Patented July 18, 1950

2,515,274

UNITED STATES PATENT OFFICE 2,515,274

HYDRAULIC UNIT FOR CABLE EXPANSION AND CONTRACTION

Harold A. Stevenson, Torrance, Calif.

Application July 12, 1946, Serial No. 683,036

2 Claims. (Cl. 74—501)

My invention relates broadly to hydraulic units and more particularly to a construction of hydraulic unit for compensating for expansion and contraction in tensioned members and cables for maintaining tension throughout a wide range of variable conditions.

One of the objects of my invention is to provide an improved and compact construction of hydraulic unit for compensating for the expansion and contraction of tension members and cables over a wide range of variable temperatures and pressures.

Still another object of my invention is to provide an improved construction of self-contained hydraulic unit for compensating for the expansion and contraction of tensioned members and cables, including expansion means within the unit for compensating for volumetric displacement of the fluid medium within the unit and assuring the tensioning of connected cables over a wide range of variable temperature and barometric conditions.

Still another object of my invention is to provide a construction of hydraulic unit for compensating for the expansion and contraction of tensioned members or cables and maintaining tension throughout a wide range of variable conditions in which the unit includes an expansible and contractable volumetric chamber vented to the atmosphere and operative to compensate for displacement of the fluid medium within the unit.

Figure 18:
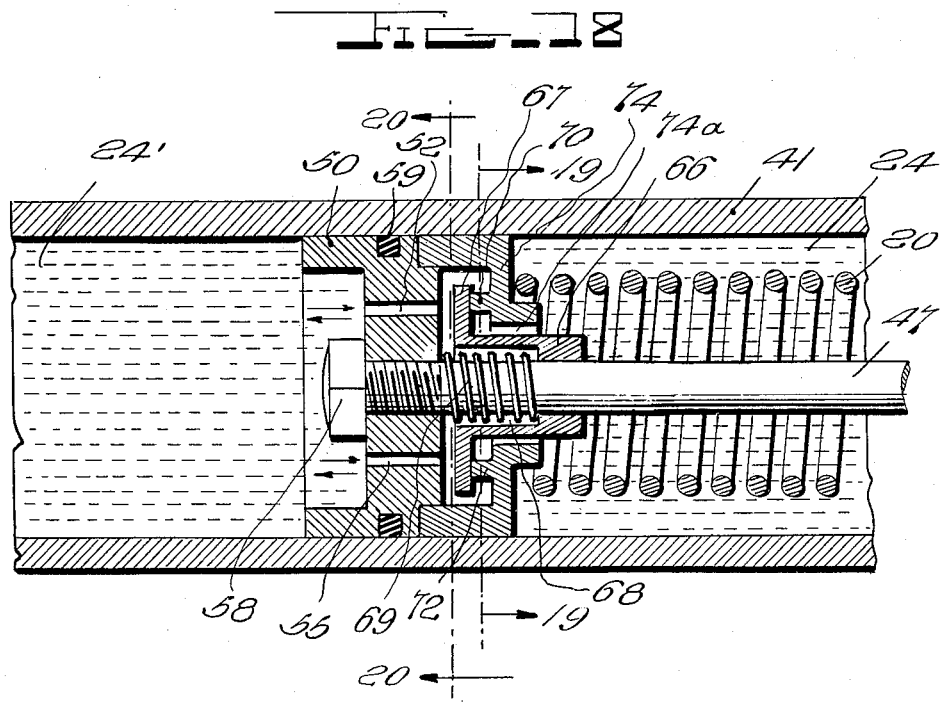
Figures 19, 20:
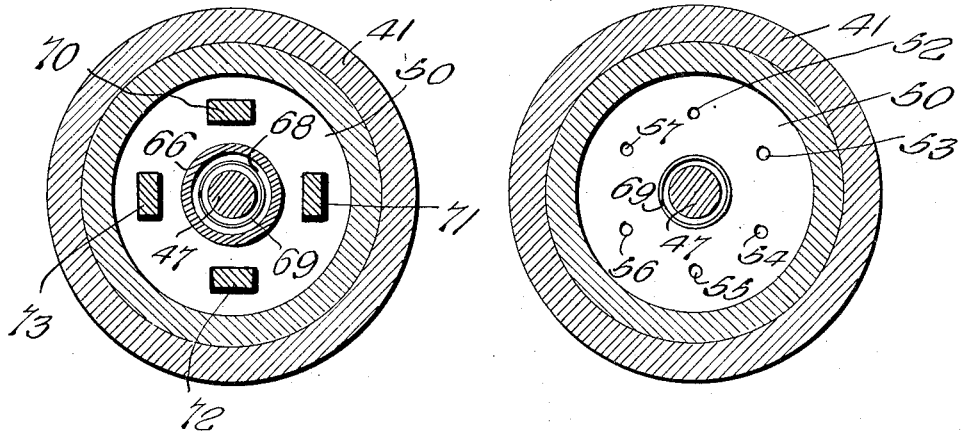

Other and further objects of my invention reside in an improved construction of spring-tensioned hydraulic volumetrically compensated unit for tensioning members and cables as set forth more fully in the specification hereinafter following by refernce to the accompanying drawings, in which:

Figure 1 is a side elevational view of the hydraulic unit of my invention; Fig. 2 is an end view of the unit shown in Fig. 1 looking in the direction of arrow A; Fig. 3 is an end view of the unit shown in Fig. 1 looking in the direction of arrow B; Fig. 4 is a longitudinal vertical sectional view through the hydraulic unit of my invention; Fig. 5 is a transverse sectional view taken on line 5—5 of Fig. 4; Fig. 6 is a transverse sectional view taken on line 6—6 of Fig. 4; Fig. 7 is a transverse sectional view taken on line 7—7 of Fig. 4; Fig. 8 is an elevational view of the valve element employed in the hydraulic unit; Fig. 9 is a side view of the valve element illustrated in Fig. 8; Fig. 10 is a vertical sectional view taken on line 10—10 of Fig. 8; Fig. 11 is a longitudinal vertical sectional view taken through a modified form of hydraulic unit embodying my invention; Fig. 12 is a transverse sectional view taken on line 12—12 of Fig. 11; Fig. 13 is a transverse sectional view taken on line 13—13 of Fig. 11; Fig. 14 is a transverse sectional view taken on line 14—14 of Fig. 11; Fig. 15 is an enlarged cross sectional view through the piston employed in the hydraulic unit shown in Fig. 11; Fig. 16 is an elevational view of the valve employed in the form of my invention shown in Fig. 11; Fig. 17 is a vertical sectional view through the valve on line 17—17 of Fig. 16; Fig. 18 is a fragmentary longitudinal sectional view through a further modified form of valve structure which may be employed in the hydraulic unit of my invention; Fig. 19 is a transverse sectional view taken on line 19—19 of Fig. 18; Fig. 20 is a transverse sectional view taken on line 20—20 of Fig. 18; and Fig. 21 is a schematic view showing one of the applications of the hydraulic unit of my invention as a protective means in the cable-control system of an aircraft aileron operating system.

I have developed the hydraulic unit of my invention for the precision tension of cables under wide variations of temperature and barometric conditions. The hydraulic unit of my invention maintains tension of cables throughout a temperature range of from approximately 140° F. to approximately —40° F. The hydraulic unit includes a cylinder within which a spring Sylphon tube or metallic bellows is arranged within the cylinder and vented continuously to the atmosphere. The cylinder includes a longitudinally slidable piston member and a spring control therefor, the piston member carrying special valve means. The piston member normally confines a body of oil between opposite ends thereof and the opposite ends of the cylinder. The cylinder is connected at one end in the cable system to be compensated, and a piston rod which connects to the slidable piston within the cylinder is connected at its opposite end with the other end of the cable system to be compensated. The hydraulic unit is thus continuously maintained in tension and as the cable system expands and contracts, the hydraulic unit compensates for such expansion and contraction by displacement of the piston within the cylinder and change in volumetric size of the metallic bellows or Sylphon tube. The important feature of my invention is the compensation for volumetric change within the control cylinder in accordance with the linear displacement of the piston.

Referring to the drawings in detail, reference character 1 designates the control cylinder of the hydraulic unit which is internally screw-threaded at opposite ends thereof, as represented at 1a and 1b, for receiving externally screw-threaded plugs 2 and 3. The screw-threaded plug 3 is provided with a wear-resisting bushing 4 through which the piston rod 5 slides. The piston rod 5 is connected at its extremity to a fitting 6 to which connection is made through eyelet 6a with the cable to be tensioned, as shown more particularly in the schematic view illustrated in Fig. 21, wherein tension member or cable 7 connects to fitting 6 and leads to the elevator 8 of the aircraft represented at 9. The elevator 8 is merely illustrative and representative of any aerofoil such as a rudder, aileron or any other plane-like control surface. The elevator control is illustrated as including a rocker arm 10 pivoted at 11 and connected at one end to the hydraulic unit 1 and at the other end to the hydraulic unit 1'. The hydraulic unit 1' is identical in construction to the hydraulic unit 1 and has the piston rod thereof connected to fitting 6' which connects to control cable 7'. The control cables 7 and 7' connect to opposite control positions for the elevator 8 which is pivoted to move about center 12.

The elevator control system is schematically illustrated as including a link 14 pivotally connected to one end of the control lever illustrated at 15 as pivoted at 16. The yoke 17 is arranged in convenient position for operation by the pilot from the pilot's position, represented at 18.

The hydraulic units 1 and 1' can be installed in any aircraft without major change of aircraft structure except for the shortening of the cables or tensioned members sufficiently to include the interposed hydraulic units. The importance of the hydraulic unit of my invention will be appreciated when it is considered that aircraft control cables are generally regulated at the factory and have a predetermined allowable tension under the conditions in which the cable is regulated; that is, at approximately room temperature. In the operation of the aircraft, especially in high altitude winter flying, the difference in contraction between the two unlike metals such as the steel control cable and the aluminum alloy of the fuselage or hull of the aircraft is so great as to cause slack in the control cables. This results in the fact that each time the control column or stick is moved, it is necessary to take up the slack in the control cable before the aileron, rudder, or elevator plane is moved. In rough air such as is encountered in bad flying weather, this may cause a buffeting of the controls which sets up additional strains in the whole control system.

The piston rod 5 passes through the recessed oil seal 3a in the screw-threaded plug 3 and through the gasket 19 to the interior of the cylinder 1. The interior end of plug 3 is recessed at 3b for forming a socket receiving the end of coil spring 20 which is seated in socket 3b and extends concentrically around piston rod 5 abutting against the valve casing 21. The valve casing 21 is carried by the screw-threaded portion 5a of the piston rod 5 and forms a housing constituting a valve chamber 22 which is ported at 23 by means of the parallel extending apertures disposed in the valve casing 21. The ports 23 serve as passages for the oil represented at 24 as contained within cylinder 1 for the transfer of the oil from one side of piston 25 to the opposite side thereof into the portion of the cylinder 1 where the oil is represented at 24. The piston 25 is centrally apertured at 25a for the passage of the threaded end 5a of piston rod 5. The piston 25 is secured in position on piston rod 5 by means of the cap screw 26 which engages the screw threads 5g on the end of the piston rod 5 and confines piston 25 in position against shoulder 5b on piston rod 5 with the interposed washer 27, valve casing 21, piston 25 and washer 28.

The piston 25 is provided with equi-spaced recesses or pockets 25a, 25b, and 25c, each of which receive the coil springs designated at 29, 30, and 31. The coil springs 29, 30, and 31 each yieldably bear upon the valve plate 32 for normally urging the valve plate into a position tending to open ports 33, 34, and 35 at piston 25. The valve plate 32 carries equi-distant projections 32c thereon of segmental contour which serve as abutments against the inner wall of the valve casing 21, limiting the travel of valve disc 32 toward the ports 23 in valve casing 21. When, however, the pressure of oil indicated in the section 24 in cylinder 1 overcomes the tention of the coil springs 29, 30, and 31, the valve 32 is displaced to a position sealing the ports 33, 34, and 35 and precluding the further transfer of fluid from one side of the piston to the other and cushioning the piston against the volumetric chamber constituted by the metallic bellows or Sylphon tube 36.

The disc-like valve 32 has two limiting positions, one of which effectively closes passages or ports 33, 34, and 35 by movement of the disc-like valve 32 against the yieldable pressure of coil springs 29, 30, and 31. Under this condition the transfer of oil is obstructed. The other limiting position of disc-like valve 32 is that in which the coil springs 29, 30 and 31 force disc-like valve 32 to a position in which the extensions 32c abut against the valve casing 21 maintaining an open passage for oil between ports 23 around notches 32a and 32b and through ports 33, 34, and 35, thereby allowing the free interchange and transfer of oil from one side of the piston 25 to the other.

The metallic bellows or Sylphon tube 36 terminates in a screw-threaded plug 37 which is engaged in screw-threaded recess 2a in end plug 2. An internal passage 37a in the screw-threaded plug 37 is aligned with the vent passage 2b in the end of plug 2, allowing atmospheric pressure to be maintained interiorly of the metallic bellows or Sylphon tube 36. Changes in barometric pressure, changes in temperature, and changes in pressure within cylinder 1 modifies the volumetric size of the metallic bellows or Sylphon tube 36. Plug 2 terminates in lugs which I have represented at 2c which serve to establish pivotal connection with the rocker arm which I have indicated at 10.

Oil may be supplied to the cylinder 1 through plugged apertures represented at 38 and 39 on opposite ends of the path movement of piston 25.

With the hydraulic unit interposed in a cable system, a load applied to the cable operates to effect a closing of valve 32 as the oil at 24 cannot be compressed and becomes a solid hydraulic unit in which piston rod 5 draws piston 25 against the action of coil spring 20, displacing disc-like valve 32 against springs 29, 30, and 31 closing ports 33, 34, and 35 in piston 25. When the pressure on the cable or tension member is less than the amount required to close valve 32, which is very slight, valve 32 is open and spring 20 holds the necessary tension on the cable through a temperature range of from approximately −40° F. to approximately 140° F.

Any change in the cable length due to expansion or contraction is so very gradual that the flow of oil from one side of the piston 25 to the other is taken care of by change in position of valve 32; since the pressure at any time during this change is not great enough to close this valve. This unit does not require an outside reservoir as the oil supply is contained in the opposite end of the cylinder which contains the Sylphon tube 36. The Sylphon tube 36 is used with an outside air bleed 2b to the inside of the tube so as to take care of the difference in volume as the piston changes from normal position, approximately 70° F., to either approximately −40° F., or approximately 140° F.

In Figs. 11–17 I have illustrated a modified form of hydraulic unit embodying the same principles as those heretofore explained but simplified as to valve structure. In this arrangement a cylindrical casing 41 is provided, internally screw-threaded in each end thereof as indicated at 41a and 41b, and is annularly recessed at 41a', and 41b' for receiving the end plugs 42, and 43, each of which carries sealing gaskets 44, and 45 for establishing pressure-tight joints with the opposite ends of the cylindrical casing 41. The plug 43 is provided with a wear-resisting bushing 46 therein through which the piston rod 47 (corresponding to piston rod 5 in Fig. 4) extends. A gasket seal is provided at 48 in plug 43 surrounding piston rod 47. The piston rod 47 passes through the coil spring 20 seated at one end in the socket-like recess 43a of plug 43 and operative at its other end against the end wall of valve casing 49 which forms part of the piston 50. The valve casing 49 forms a housing for the resilient disc-like valve 51 which is displaceable on the piston rod 47 under control of the fluid pressure exceeded by the body of oil 24 when tension is applied to piston rod 47. Such action tends to flatten out the disc-like valve 51 against the ports 52, 53, 54, 55, 56, and 57 in piston 50, whereby, the body of oil 24 serves as a solid hydraulic unit against tension applied on piston rod 47. However, when tension is relieved on piston rod 47, piston 50 is displaced toward the section of the cylinder, including the body of oil 24' and the oil is allowed to flow through ports 52–57 around the peripheral edge of disc-like valve 51 into the body of oil represented at 24 through the enlarged center opening 49a in valve casing 49.

The piston 50 is secured on the screw-threaded end of piston rod 47 and a confining nut 58 secured thereover. The opening 49a in valve casing 49 constitutes a sufficiently large annular sleeve to permit the transfer of oil from one side of piston 50 to the other side thereof. A gasket 59 is carried by piston 50 for ensuring against leakage of oil from one side of the piston 50 to the other side thereof without passing through the control valve within the piston 50.

The plug 42 has a screw-threaded recess 42a therein for receiving the screw-threaded stem 60 of the Sylphon tube 61. The screw-threaded recess 42a is aligned with the vent opening 42b in the end of plug 42 for the free introduction and discharge of atmospheric pressure to the interior of the Sylphon tube. The end of the plug 42 is provided with lugs 42c to provide a pivotal connection to the rocker arm 10.

Oil may be supplied to the cylinder 41 through plugged openings 62, and 63 adjacent opposite ends of cylinder 41 and on opposite sides of piston 50.

The operation of the hydraulic unit shown in Figs. 11–17 is identical to that heretofore explained. Changes in temperature and barometric pressure serve to change the volumetric size of the metallic bellows or Sylphon tube 61 provided for the required displacement of oil within the cylinder according to the expansion or contraction forces applied to piston rod 47. The area occupied by the piston rod 47 is compensated for by the operation of the volumetric change in size of metallic bellows or Sylphon tube 61.

In Figs. 18, 19, and 20 I have illustrated a further modified construction of valve which I have found very effective in operation in the hydraulic unit of my invention. In this arrangement the piston 50 is carried by piston rod 47 in a manner similar to that illustrated in Fig. 11 for operation within cylinder 41. The piston rod 47 is screw-threaded to receive the piston 50. The valve member 66 has an annular flange or plate 67 thereon and is annularly recessed at 68 to receive the coil spring 69 which is yieldably operative between the end wall of the recess 68 and the face of the piston 50. The flange 67 when moved against the tension of spring 69 toward the left serves to close the ports 52, 53, 54, 55, 56, and 57 in the piston 50, preventing the interchange of oil between the area 24 and 24' in cylinder 41. When, however, tension is relieved on piston rod 47, valve member 66 is shifted toward the right and the valve plate 67 thereof engages against the abutments formed by projections 70, 71, 72, and 73 on the valve casing represented at 74.

The valve casing 74 is similar to the valve casing 49 in the arrangement illustrated in Fig. 11, in that the valve casing forms a substantial continuation of the cylindrical contour of piston 50. The central annular portion of the valve casing 74 is sufficiently spaced from the sleeve-like valve member 66 to provide an annular passage 74a between the valve casing 74 and the sleeve-like valve member 66. Thus plate 67 may seal the passage of oil through the piston 50 by displacement of plate 67 against passages 52–57 inclusive, and provide a transfer path for oil by displacement under control of spring 69 toward the right, as represented in Fig. 18, depending upon conditions of expansion or contraction resulting from differences in temperature and barometric pressure.

Fig. 21 is representative of but one application of the hydraulic unit of my invention. While I have found the unit very effective in aircraft controls, my invention is also applicable to mobile units generally which must be operated in both torrid and frigid zones, as well as stationary equipment including cable controls which must be relied upon for operation regardless of geographical location.

While I have described my invention in certain of its preferred embodiments, I realize that modifications may be made and I intend no limitations upon my invention other than may be imposed by the scope of the appended claims.

What I claim as new and desire to secure by Letters Patent of the United States is as follows:

1. In a hydraulic unit for compensating for the expansion and contraction of tensioned members or cables, a cylinder, a piston within said cylinder, said piston having ports therethrough in portions around the center thereof, a piston rod connected with said piston, a valve housing substantially conforming to the section of said piston and displaced therefrom for a distance to provide a valve chamber having a central port therein and having projecting abutments disposed in spaced relation around said port, a valve member including a flange coacting with said projecting abutments on one side and operative to close the ports through said piston on the opposite side, a sleeve member integral with said flange and extendible through the central port in said valve housing, and spring means surrounding said piston rod and interposed between said sleeve and said piston for normally urging said flange into closed relation with the spaced abutments on said valve housing.

2. A valve for a hydraulic unit including a cylinder, a piston in said cylinder, means for mounting said cylinder for movement with respect to said piston, said piston including ports extending longitudinally therethrough, a valve housing conforming in section with said piston and spaced from said piston to provide a valve chamber, said valve chamber having a central port therein and a multiplicity of spaced projecting abutments surrounding said port, a piston rod extendible through said port and connected with said piston, and a displaceable valve having a sleeve member slidable on said piston rod and limited in movement in one direction by contact with the spaced projecting abutments on said valve chamber and limited in the opposite direction by contact with said piston for closing the ports therein, and spring means interposed between said sleeve and said piston for yieldably urging said flange against said spaced projecting abutments.

HAROLD A. STEVENSON.

REFERENCES CITED

The following references are of record in the file of this patent:

UNITED STATES PATENTS

| Number | Name | Date |
|---|---|---|
| Re. 17,184 | Wolf | Jan. 1, 1929 |
| 2,314,404 | Katcher | Mar. 23, 1943 |
| 2,323,352 | Pitts | July 6, 1943 |
| 2,327,021 | Cushman | Aug. 17, 1943 |
| 2,375,050 | Tauscher | May 1, 1945 |
| 2,405,062 | Sheldon | July 30, 1946 |
| 2,417,504 | Knaggs et al. | Mar. 18, 1947 |
| 2,417,581 | Aldred, Jr. | Mar. 18, 1947 |